(No Model.)
H. C. WIRT.
SYSTEM OF ELECTRIC METERING.
No. 602,925. Patented Apr. 26, 1898.
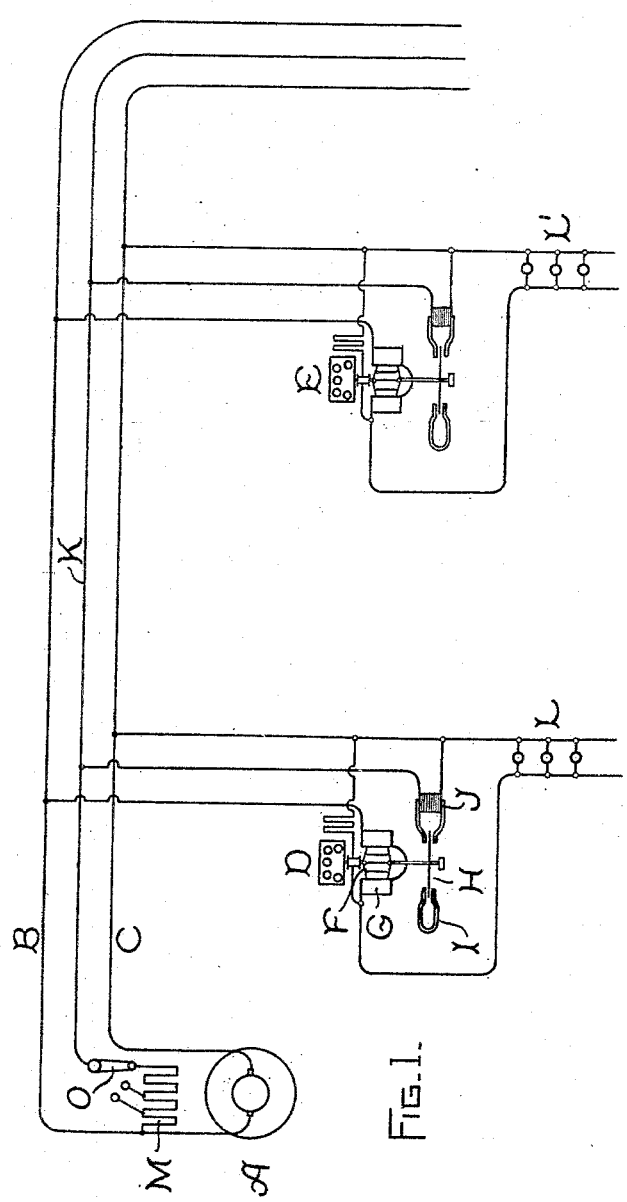
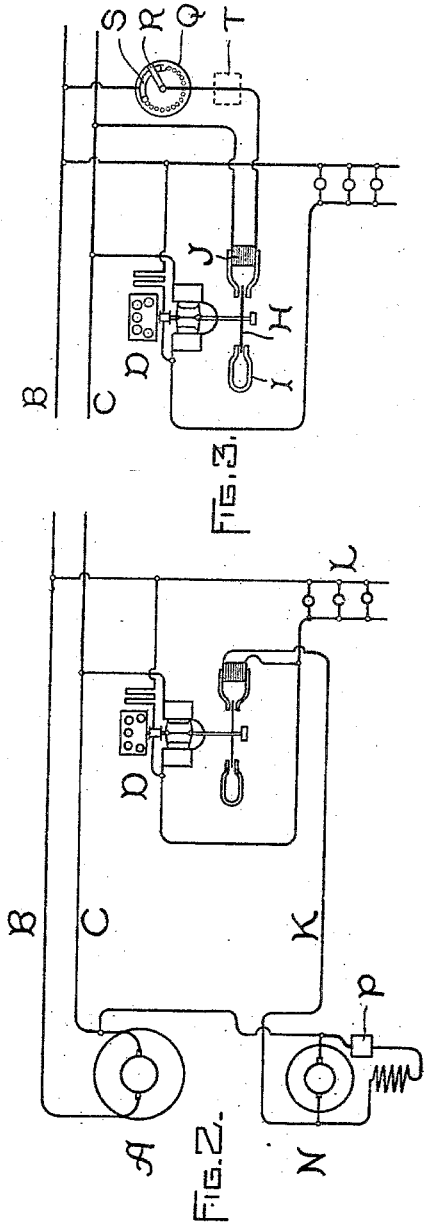
WITNESSES  
E. Williams, Jr.  
A. G. Macdonald.
INVENTOR  
Herbert C. Wirt, by  
Albert G. Davis  
Atty.

UNITED STATES PATENT OFFICE.

HERBERT C. WIRT, OF SCHENECTADY, NEW YORK, ASSIGNOR TO THE GENERAL ELECTRIC COMPANY, OF NEW YORK.

SYSTEM OF ELECTRIC METERING.

SPECIFICATION forming part of Letters Patent No. 602,925, dated April 26, 1898.

Application filed December 31, 1897. Serial No. 665,038. (No model.)

*To all whom it may concern:*

Be it known that I, HERBERT C. WIRT, a citizen of the United States, residing at Schenectady, in the county of Schenectady, State of New York, have invented certain new and useful Improvements in Systems of Electric Metering, (Case No. 586,) of which the following is a specification.

My invention relates to electric metering systems in which discounts are given to the user during certain portions of the day to encourage the use of current for power or lighting at a time when the load on the central station is small—as, for example, during late evening and early morning hours.

My invention has for its object to provide a system in which the rate of registration for a given current of all or a group of meters can be adjusted from a distant point—as, for example, the supply or a substation. To accomplish this, I provide each meter with a damping mechanism which is controllable from a common point. This damping mechanism may or may not form a part of the well-known retarding mechanism of the meter. I have found it to be a satisfactory arrangement to provide each meter with an electromagnetic damper which is normally idle, but energized from the central station at such times during the day as it is desired to give a discount to the user. By this arrangement the meters now installed can be utilized by making a very slight change—*i. e.*, by inserting an extra magnet in the casing and making an opening for one wire.

In the accompanying drawings, Figure 1 is a diagrammatic view illustrating my invention, and Figs. 2 and 3 are slight modifications.

In Fig. 1, A represents the source of current-supply located at a central station, and extending therefrom are mains B and C. For the purpose of illustration I have shown two separate loads L and L', with their meters D and E; but it is to be understood that any number of translating devices can receive current from the same source. The meters D and E are of the well-known Thomson motor-meter type and are connected in circuit in any desired manner. In the present instance the armature F of each meter is connected across the mains and the field-coils G in series with one of the mains. Mounted upon the armature-shaft is a metal disk H, which in the case of induction-meters could be the armature itself, and adjacent to the disk is a damping-magnet I, constituting the normal retarding mechanism of the meter. In addition to this an electric damping mechanism J is provided, normally idle, but which is energized when it is desired to give a discount to the users of electric current by increasing the drag on the armature, thereby reducing its speed for a given flow of current. Extending from the supply or a substation is a main K, which supplies current to the electromagnets of the various meters on the system. Wire K derives its energy from the main source of supply, and by employing a suitable resistance M and adjusting switch-arm O the current flowing in the coils on the damping-magnets can be regulated. Coils J of the various magnets are connected in multiple with the source of supply, one end of each coil being connected to the third main K and the other to the negative side of the system.

While an electromagnetic damper is shown as illustrating my invention, I broadly claim any means for changing the braking or retarding effect of a meter to change the rate of registration. While the preferable arrangement is to control all of the auxiliary damping devices from a single point, I may control the damping mechanism of each meter separately—by means of a clock, for example, located on the meter.

In Fig. 2 is illustrated a slight modification of my invention which is particularly applicable to alternating-current systems of distribution. The meter is constructed and connected in circuit the same as in the first instance; but instead of employing current derived from the main source for controlling the damping mechanism a separate source of continuous current is employed, comprising a small generator N, having one of its positive mains connected to the third wire K and its negative wire to one of the circuit-mains. By employing one of the circuit-mains as a return-wire I am enabled to operate the system with the use of a single additional wire.

In Fig. 3 is shown a slight modification in which B and C represent the circuit-mains, D the meter, and I and J the damping-magnets acting upon disk H. Instead of regulating the action of the electrodamping-magnet J from the central station or other distant point it is controlled locally—that is to say, each meter is provided with a suitable switch mechanism for cutting the electrodamping-magnet into and out of circuit. This switching may be performed by a clock, preferably self-winding, which may be located within the meter-casing or in some separate receptacle, as desired. In the present instance clock Q is situated to one side of the meter and is provided with a moving hand R, arranged to make contact with plate S. With the parts arranged as shown magnet J is connected in shunt across the mains B and C and furnishes an additional drag on the meter to give a reduced rate. If necessary to reduce the current flowing in the magnet-circuit, a resistance T may be used, as shown in dotted lines. The length of contact S determines the length of time that a discount is to be given, and by providing more than a single contact for each meter the hours of discount may be arranged in any desired manner. If desired, clock Q can be located at the central station and automatically control all the meters from a single point.

The operation of the invention is as follows: Assume that it was decided to give a discount of twenty-five per cent. to the users between ten a. m. and two p. m. Switch O is moved to a contact-point either automatically or manually, where the amount of current which will flow through wire K will be sufficient to energize magnets J to a certain predetermined amount and put an additional drag on the meter-armature sufficient to cause it to register for a given load twenty-five per cent. lower than before.

The operation of the arrangement shown in Fig. 2 is similar, except that the amount of current flowing in wire K is adjusted by varying field-rheostat P.

In Fig. 3 current is supplied to the load by mains B and C, and the damping or retarding action of the meter is controlled by hand R of clock Q, which connects the energizing-coil of magnet J across the mains when it is desired to give a discount.

What I claim as new, and desire to secure by Letters Patent of the United States, is—

1. In a system of electric metering, the combination of circuit-mains, a motor mechanism for registering the consumption of energy, and automatic means for varying the damping or retarding effect of the meter.

2. In a multirate electric meter, the combination of a motor mechanism, for registering the consumption of energy in an electric circuit, a retarding mechanism which governs the speed of the motor mechanism, and means for altering the retarding or braking effect to change the rate of registration during certain portions of the day.

3. In a two-rate meter, the combination of a motor mechanism for registering the consumption of energy, a damping or retarding mechanism opposing the action of the motor mechanism, and a second retarding mechanism which assists the first when it is desired to give a discount to the consumer.

4. In a metering system, the combination of a number of meters located at various points in the system, each meter comprising a motor mechanism, a register and retarding mechanism, and means for controlling the retarding mechanism of a number of the meters from a common point, as for example, a station or substation.

5. In a system of electric metering, the combination of a plurality of meters situated at the points of consumption, each meter consisting of motor and retarding mechanisms, a recording device, and an auxiliary retarding mechanism, the arrangement of the auxiliary retarding mechanism being such that it can be controlled from a distant point to change the rate of registration, independent of the energy passing through the meter.

6. In an electric meter, the combination of a motor mechanism, actuated by the energy consumed in the circuit, a retarding mechanism comprising a closed-circuit conductor moving within the field of a permanent magnet, an additional retarding device comprising an electromagnet, and means for controlling the action of the electromagnet.

In witness whereof I have hereunto set my hand this 29th day of December, 1897.

HERBERT C. WIRT.

Witnesses:
B. B. HULL,
C. L. HAYNES.